United States Patent
Oshima et al.

(10) Patent No.: US 7,111,477 B2
(45) Date of Patent: Sep. 26, 2006

(54) PRODUCTION METHOD OF OPTICAL SYNTHETIC QUARTZ GLASS, OPTICAL SYNTHETIC QUARTZ GLASS, AND ANNEALING FURNACE

(75) Inventors: Takayuki Oshima, Koriyama (JP); Akira Fujinoki, Koriyama (JP)

(73) Assignees: Heraeus Quarzglas GmbH & Co. Kg, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 427 days.

(21) Appl. No.: 10/320,338

(22) Filed: Dec. 16, 2002

(65) Prior Publication Data

US 2003/0228119 A1 Dec. 11, 2003

(30) Foreign Application Priority Data

Dec. 18, 2001 (JP) .............................. 2001-384505

(51) Int. Cl.
*C03B 25/00* (2006.01)
*C03B 20/00* (2006.01)
*C03B 25/02* (2006.01)

(52) U.S. Cl. ........................................ 65/111; 65/117

(58) Field of Classification Search ................. 65/111, 65/117, 120, 17.6; 428/542.8
See application file for complete search history.

(56) References Cited

U.S. PATENT DOCUMENTS

| | | | |
|---|---|---|---|
| 2,106,526 A * | 1/1938 | Hood ........................... | 501/57 |
| 4,149,868 A * | 4/1979 | Deeg ........................... | 65/30.11 |
| 5,325,230 A * | 6/1994 | Yamagata et al. ........... | 359/350 |
| 6,578,382 B1 * | 6/2003 | Ueda et al. .................. | 65/30.1 |
| 2002/0122902 A1 * | 9/2002 | Ueda et al. ................. | 428/34.4 |
| 2003/0089307 A1 * | 5/2003 | Wehrhan et al. ............ | 117/200 |
| 2005/0092231 A1 * | 5/2005 | Hawtof et al. ............... | 117/81 |

FOREIGN PATENT DOCUMENTS

| | | |
|---|---|---|
| EP | 0 870 737 A | 10/1998 |
| EP | 1 033 350 A | 9/2000 |
| EP | 1 067 096 A | 1/2001 |
| EP | 1 084 995 A | 3/2001 |
| JP | 2001-220159 A | 8/2001 |
| JP | 2001-270725 | * 10/2001 |
| WO | WO 00 39038 A | 7/2000 |

OTHER PUBLICATIONS

Patent Abstracts of Japan (EPO) for JP 2001-220159; Aug. 14, 2001.

* cited by examiner

*Primary Examiner*—John Hoffmann
(74) *Attorney, Agent, or Firm*—Tiajoloff & Kelly (57) ABSTRACT

An object is to provide a method for producing an optical synthetic quartz glass and an optical synthetic glass, having a birefringence of lower than 0.5 nm/cm and having favorable refractive index distribution, yet without lowering the productivity, as well as to provide an annealing furnace suitably used in practicing said method. In a step of raising the temperature of a columnar optical synthetic quartz glass preform to a temperature of from 800° C. to 1200° C., and after keeping for a definite time, lowering the temperature, the temperature is lowered with a temperature difference of from 1 to 20° C. between the temperature of the light transmitting surface of the optical synthetic quartz glass preform and the temperature of the outer peripheral side surface of the optical synthetic quartz glass preform at temperature-lowering rates of from 2 to 50° C./hour, respectively.

18 Claims, 9 Drawing Sheets

L: Light transmitting direction
E: Light transmitting surface
G: Quartz glass (b)

L: Light transmitting direction
E: Light transmitting surface
G: Quartz glass
F: Isothermal surfaces

(prior art)

(b)

US 7,111,477 B2

PRODUCTION METHOD OF OPTICAL SYNTHETIC QUARTZ GLASS, OPTICAL SYNTHETIC QUARTZ GLASS, AND ANNEALING FURNACE

TECHNICAL FIELD TO WHICH THE INVENTION BELONGS

The present invention relates to a production method of synthetic quartz glass for optical use, a synthetic quartz glass, and an annealing furnace; in particular, it relates to a production method of optical synthetic quartz glass useful in the field where the optical transmitting plane with a low birefringence and a high homogeneity in the refractive index distribution are required, for instance, in precision optical equipments for use in photolithography and the like, and it relates to an optical synthetic quartz glass and an annealing furnace suitably used in practicing the production method.

RELATED ART

With increasing degree of integration of LSIs these days, finer patterns are being made by shortening the wavelength of the light sources. From the viewpoint of achieving higher transmittance for ultraviolet radiations, quartz glass is being used as optical elements for ultraviolet lithography, however, the light sources are shifting from KrF excimer laser (248 nm) to ArF excimer laser (193 nm), and the optical quality requirements for the quartz glass, which is used as the optical elements, are becoming more severe. Such optical qualities include birefringence.

Figure 9:
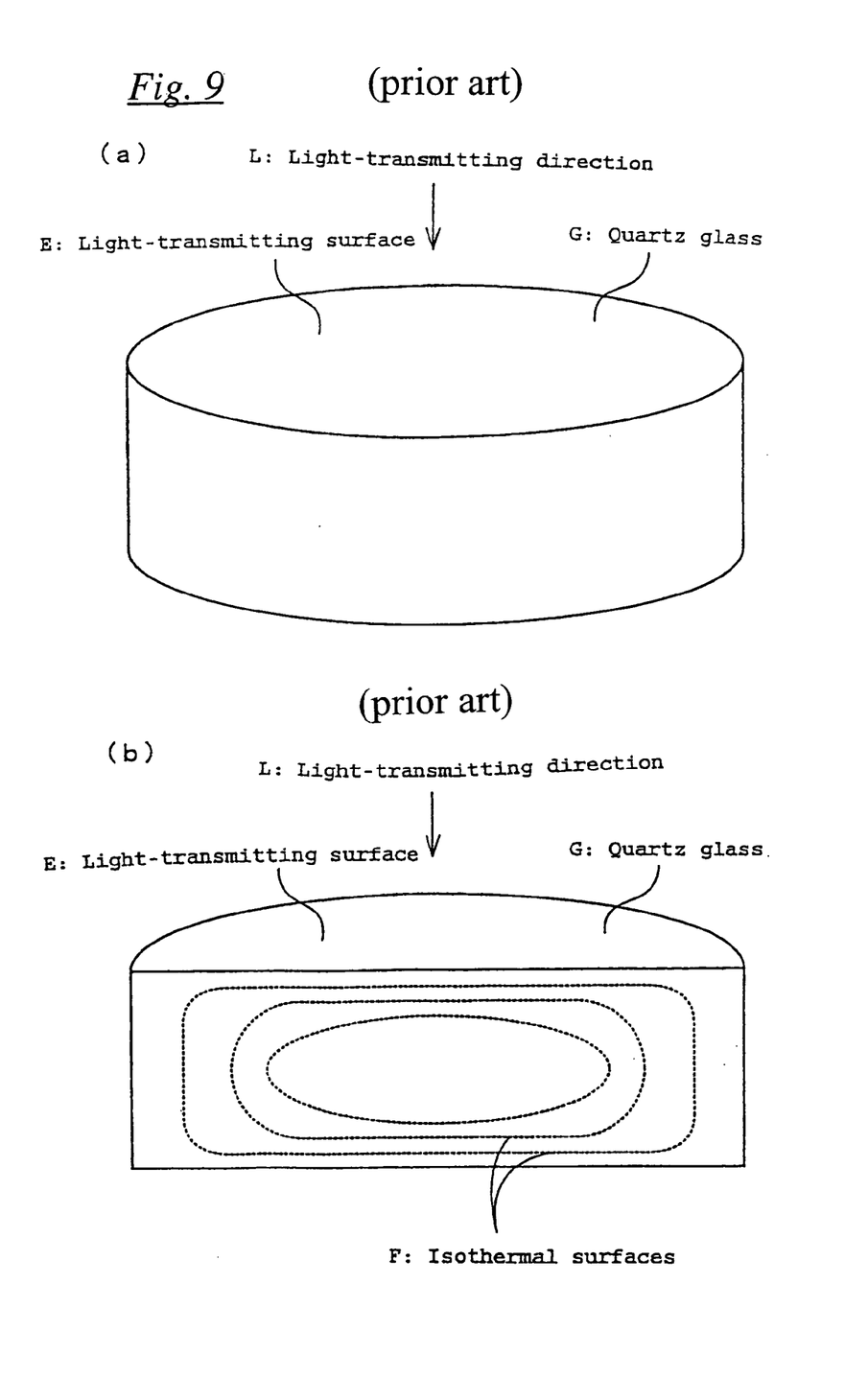
FIG. 9 is an explanatory view showing an embodiment of an optical synthetic quartz glass of related art, wherein (a) is a slant view of the whole embodiment and (b) is a cross-sectional view of (a).

Conventionally, referring to FIG. 9(a), an optical synthetic quartz glass has been produced by an operation comprising maintaining an optical synthetic quartz glass G once shaped into a columnar body in an annealing furnace at a temperature not lower than the strain point for a predetermined duration of time, and gradually lowering the temperature thereafter.

However, in order to reduce the level of birefringence to the required standard for use in ultraviolet radiation lithography, the cooling rate at heat treatment had to be set to about 1° C./h. Accordingly, an extremely long time was necessary for the heat treatment, and moreover, conventional cooling method still had limitations in the possibility of reducing the birefringence.

PROBLEMS THAT THE INVENTION IS TO SOLVE

In the light of the aforementioned circumstances, the present inventors have extensively conducted studies on the cooling method for reducing the birefringence of quartz glass, and a result, they have found that, during cooling in the heat treatment, the birefringence in the direction of light transmission can be set to lower than 0.5 nm/cm by providing an isothermal plane inside the quartz glass body in a flat shape and disposed approximately in parallel with the light transmitting surface.

An object of the present invention is to provide a production method of optical synthetic quartz glass and an optical synthetic quartz glass having birefringence of the light transmitting direction of lower than 0.5 nm/cm and yet having excellent refractive index distribution, as well as to provide an annealing furnace favorably used in practicing said method.

MEANS FOR SOLVING THE PROBLEMS

In order to solve the aforementioned problems, a first embodiment of the production method for optical synthetic quartz glass according to the present is characterized in that, in a step of raising the temperature of a columnar optical synthetic quartz glass preform to a temperature of from 800° C. to 1200° C., and after keeping for a definite time, lowering the temperature, the temperature is lowered with a temperature difference of from 1 to 20° C. between the temperature of the light transmitting surface of the optical synthetic quartz glass preform and the temperature of the outer peripheral side surface of the optical synthetic quartz glass preform at temperature-lowering rates of from 2 to 50° C./hour, respectively.

A second embodiment of the production method for optical synthetic quartz glass according to the present is characterized in that, in a step of raising the temperature of a columnar optical synthetic quartz glass preform to a temperature of from 800° C. to 1200° C., and after keeping for a definite time, lowering the temperature, the temperature is lowered with a temperature difference of from 1 to 20° C. between the first temperature $T_1$ at the position parted outward from the center of at least one surface of the upper and lower surfaces, which are light transmitting surfaces of the optical synthetic quartz glass preform, by a first parted distance and the second temperature $T_2$ at the position parted outward from the outer peripheral side surface of the optical synthetic quartz glass preform by a second parted distance, at temperature-lowering rates of from 2 to 50° C./hour, respectively.

Preferably, the temperature is lowered while maintaining the definite temperature difference between said light transmitting surface or the first temperature $T_1$ and said temperature of the outer peripheral side surface or the second temperature $T_2$, respectively. Furthermore, even if some fluctuations should occur in the temperature difference above during the temperature-controlling process, the effect of the present invention can be achieved.

In FIG. 9(b) is shown the state of the isothermal plane inside the quartz glass in case the columnar quartz glass is gradually cooled in accordance with the conventional cooling method. In a conventional cooling method, as shown in FIG. 9(b), the isothermal plane F inside the columnar quartz glass G is maintained in a shape approximately similar to the shape of the columnar quartz glass G, because the temperature is lowered while the entire surface of the columnar quartz glass G is maintained at the same temperature. Accordingly, the angle that the isothermal plane F inside the quartz glass G makes with the light transmitting plane E gradually increases with approaching the outer periphery of the columnar quartz glass G.

Figure 1:
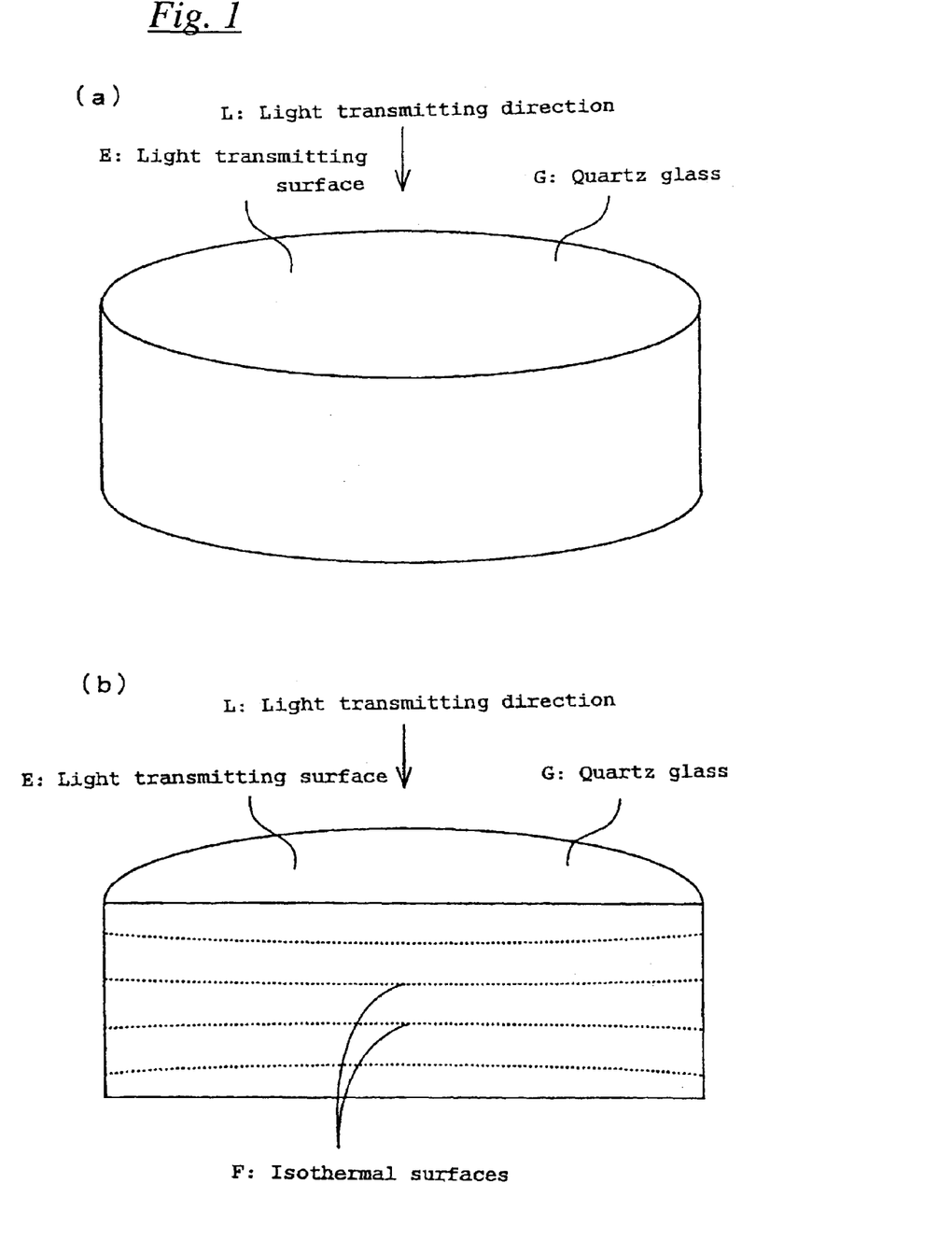
FIG. 1 is a view explaining an embodiment of the optical synthetic quartz glass of the invention, wherein (a) is a slant view of the whole embodiment, and (b) is a cross-sectional view of (a).

However, in case temperature is lowered during the heat treatment by providing a specified temperature control, which is determined from the relation between the shape of the quartz glass and the cooling rate, i.e., the relation between the first temperature $T_1$ at the position parted outward from the center of at least one surface of the upper and lower surfaces, which are the light transmitting surfaces of the columnar quartz glass [FIG. 1(a)], by a first parted distance and the second temperature $T_2$ at the position parted outward from the outer peripheral side surface of the optical synthetic quartz glass preform by a second parted distance, there can be obtained, as shown in FIG. 1(b), an isothermal plane F inside the columnar quartz glass body G with a flat shape approximately in parallel with the light transmitting plane E.

In this case, the quartz glass may be set inside the annealing furnace as such that the light transmitting direction is disposed in the longitudinal direction, or in the direction perpendicular thereto. Furthermore, the quartz glass may be set inside the annealing furnace in such a manner that it may be covered with a covering body such as a container and the like made of a quartz glass and the like.

The temperature difference between the first temperature $T_1$ at the position parted outward from the center of at least one surface of the upper and lower surfaces and the second temperature $T_2$ at the position parted outward from the outer peripheral side of said columnar quartz glass is preferably from 1 to 20° C., more preferably 1 to 15° C., and most preferably, 1 to 10° C.

In the temperature lowering step above, either of the first temperature $T_1$ and the second temperature $T_2$ can be set at a higher temperature; more specifically, there may be set as first temperature $T_1$<second temperature $T_2$, or as first temperature $T_1$>second temperature $T_2$.

As the temperature-lowering rate above, 2 to 50° C./h is applied. However, a temperature-lowering rate higher than 50° C./h is not preferred because the temperature follow-up becomes impaired, or a rate lower than 2° C./h is not preferred from the viewpoint of productivity because it increases the time duration for the treatment. The temperature-lowering rate is more preferably 2 to 20° C./h, and most preferably, 2 to 1° C./h.

As the shape for the optical columnar synthetic quartz glass above, it is preferably provided as a column having a diameter of from 150 to 350 mm and a thickness of from 40 to 120 mm.

As said first and the second parted distances, they both are preferably the same and set in a range of from 5 mm to 100 mm. In case quartz glass is covered with a covering body such as a container and the like, the first parted distance is set outward from at least one of the planes of the upper and the lower surfaces of the covering body, and the second parted distance is set outward from the outer peripheral side surface of said covering body. In this case again, the first and the second parted distances may be set the same and in a range of from 5 mm to 100 mm.

In lowering the temperature above, it is preferred to use separate temperature-controlling mechanisms for the light transmitting plane and the plane perpendicular thereto.

The first embodiment of the optical synthetic quartz glass according to the present invention is characterized in that it is produced by the production method according to the present invention, and that it has a birefringence of the light transmitting direction of lower than 0.5 nm/cm.

The second embodiment of the optical synthetic quartz glass according to the present invention is characterized in that it is produced by the production method according to the present invention, and that the optical synthetic quartz glass has a refractive index distribution An of the light transmitting direction of not higher than $2 \times 10^{-6}$.

The third embodiment of the optical synthetic quartz glass according to the present invention is characterized in that it is produced by the production method according to the present invention, and that the optical synthetic quartz glass has a birefringence of the light transmitting direction of lower than 0.5 nm/cm and a refractive index distribution An of the light transmitting direction of not higher than $2 \times 10^{-6}$.

The annealing furnace according to the present invention is an annealing furnace for heat-treating a columnar optical synthetic quartz glass preform wherein the upper and lower surfaces are light transmitting surfaces, characterized by having a chamber for containing the synthetic quartz glass preform in the inside thereof, a light transmitting surface heating heater for heating at least one of the upper and lower surfaces of the synthetic quartz glass, and a side surface heating heater for heating the outer peripheral side surface of the synthetic quartz glass, wherein the light transmitting surface heating heater and the side surface heating heater can be controlled by separate temperature-controlling mechanisms. As said chamber, preferred is a columnar chamber.

MODE FOR CARRYING OUT THE INVENTION

The mode for practicing the annealing furnace according to the present invention is described below based on FIGS. 2 to 5 of the attached drawings; however, the examples shown in the figures are shown for reference, and needless to say, various modifications thereof can be made so long as they do not deviate from the technical idea of the present invention.

Figure 2:
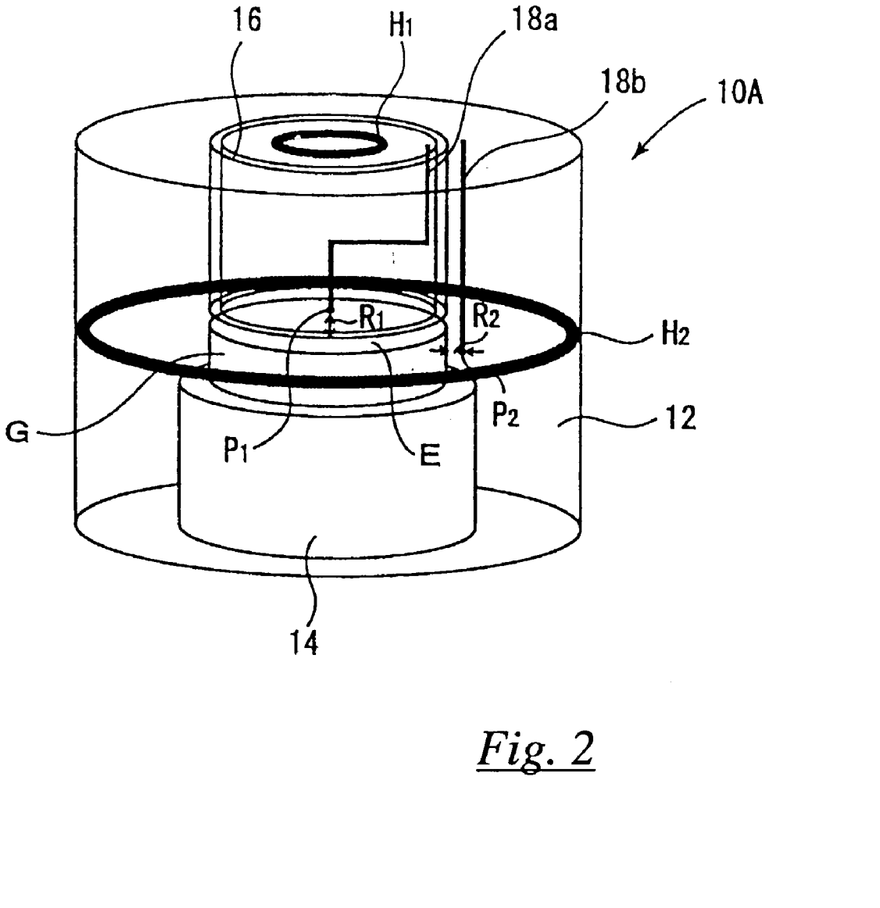
FIG. 2 is a schematic explanatory slant view showing an embodiment of the annealing furnace used for the practice of the production method of an optical synthetic glass of the invention.

FIG. 2 shows an oblique explanatory view of an example of an annealing furnace according to the present invention. Referring to the figure, the annealing furnace 10A comprises a cylindrical chamber 12. The cylindrical chamber 12 comprises a columnar base 14 provided therein. A columnar synthetic quartz glass G to be heat treated is mounted on the upper surface of said columnar base 14.

In the figure, a partition member 16 is provided on the upper side of said columnar synthetic quartz glass G inside said cylindrical chamber 12. 18a and 18b are thermocouples, wherein the upper surface side thermocouple 18a is set at a position $P_1$ apart outward by, e.g., 10 mm from the center of the upper plane of said columnar synthetic quartz glass by a first parted distance $R_1$, and the side plane side thermocouple 18b is set at a position parted outward from the outer peripheral side plane of said columnar synthetic quartz glass G by a second parted distance $R_2$, at a position $P_2$ apart from, e.g., 10 mm, so that they may each measure temperatures at positions $P_1$ and $P_2$.

A heater $H_1$ for heating the upper surface (the light-transmitting surface) is provided on the upper side of said partition member 16. On the other hand, a ring-shaped heater $H_2$ for heating the side plane is provided to the inner peripheral side plane of the cylindrical chamber 12.

By employing the constitution above, the temperature control of the upper surface side of the columnar synthetic quartz glass G mounted on a columnar base 14 can be made inside the partition member 16 by using the heater $H_1$ for heating the upper surface (light transmitting surface), and the temperature control of the side plane side of said columnar synthetic quartz glass G can be made outside the partition member 16 by using the heater $H_2$ for heating the side plane.

Figure 3:
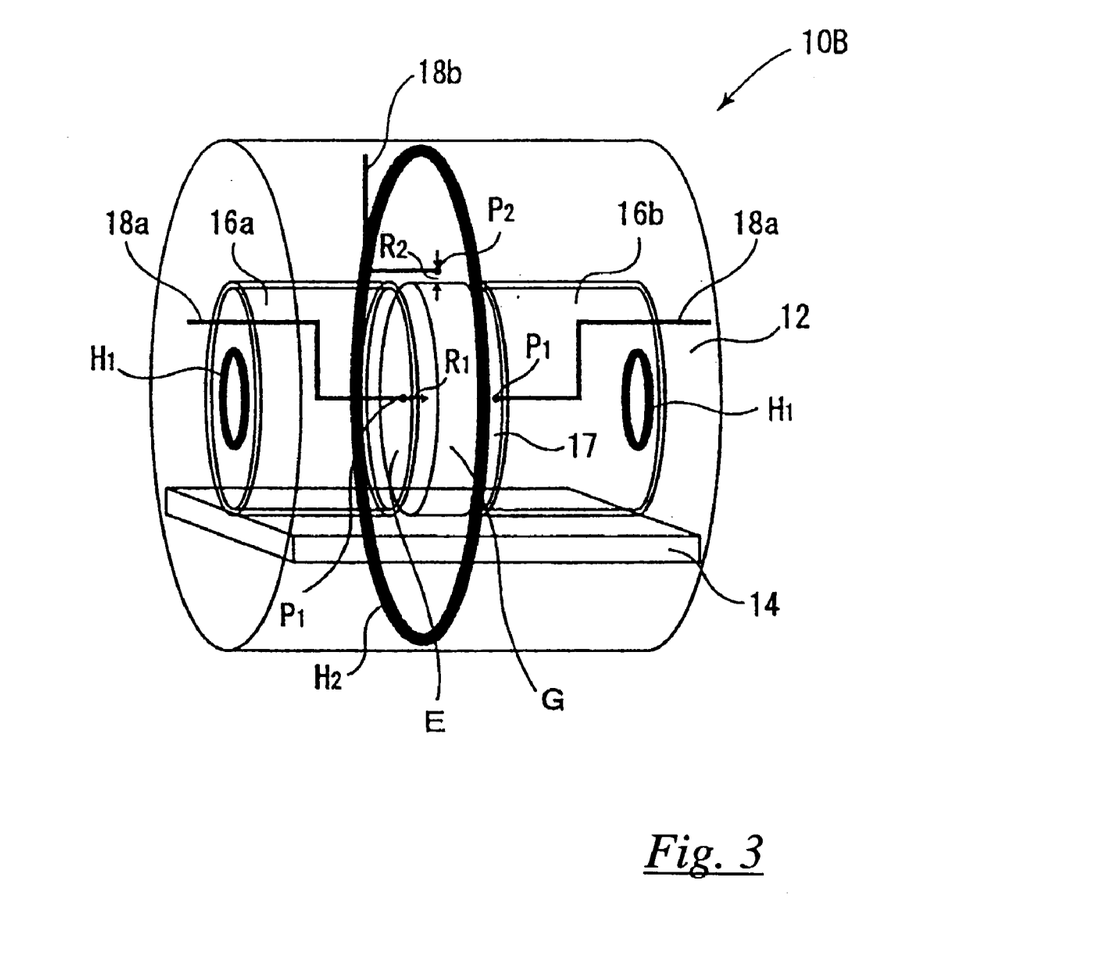
FIG. 3 is a schematic explanatory slant view showing another embodiment of the annealing furnace used for the practice of the production method of an optical synthetic glass of the invention.

FIG. 3 shows an oblique explanatory view of another example of an annealing furnace according to the present invention. In FIG. 3, the same members or the members similar to those shown in FIG. 2 are indicated by using the same signs. Referring to the figure, there is shown a horizontal annealing furnace 10B. Said annealing furnace 10B comprises a cylindrical chamber 12 set horizontally. A base plate 14 is set inside said cylindrical chamber 12.

A first partition member 16a and a second partition member 16b are set on the upper surface of said base plate 14 in such a manner that they may face each other at a predetermined distance disposed between them, and that a mounting space 17 may be formed. The columnar synthetic quartz glass G to be heat treated is set in such a manner that it might be mounted on said base plate 14, and that it may be positioned in said mounting space 17.

18a, 18a, and 18b are thermocouples, wherein the upper surface side thermocouples 18a and 18a are set at the position $P_1$ parted outward from the center of the upper plane of at least one of the upper and lower surfaces of vertically set said columnar synthetic quartz glass by a first parted distance $R_1$, for instance, at a position $P_1$ parted at a distance of 10 mm, and the side plane side thermocouple 18b is set at a position $P_2$ parted outward from the outer peripheral side plane of said columnar synthetic quartz glass G parted by a second parted distance $R_2$, for instance, at a distance of 10 mm, so that they may each measure temperatures at positions $P_1$ and $P_2$.

Heaters $H_1$ and $H_1$ for heating the upper and the lower surfaces (light transmitting surfaces) are provided to each of said first and second partition members 16a and 16b, and on the other hand, a ring-like heater $H_2$ for heating the side planes is provided on the inner peripheral side plane of the cylindrical chamber 12.

By employing the constitution above, the temperature control of the upper and the lower surface sides of the columnar synthetic quartz glass G mounted on the base plate 14 can be made inside the partition members 16a and 16b by using the heaters $H_1$ and $H_1$ for heating the upper and lower surfaces (light transmitting surfaces), and the temperature control of the side plane side of said columnar synthetic quartz glass G can be made outside the partition members 16a and 16b by using the heater $H_2$ for heating the side plane.

Figure 4:
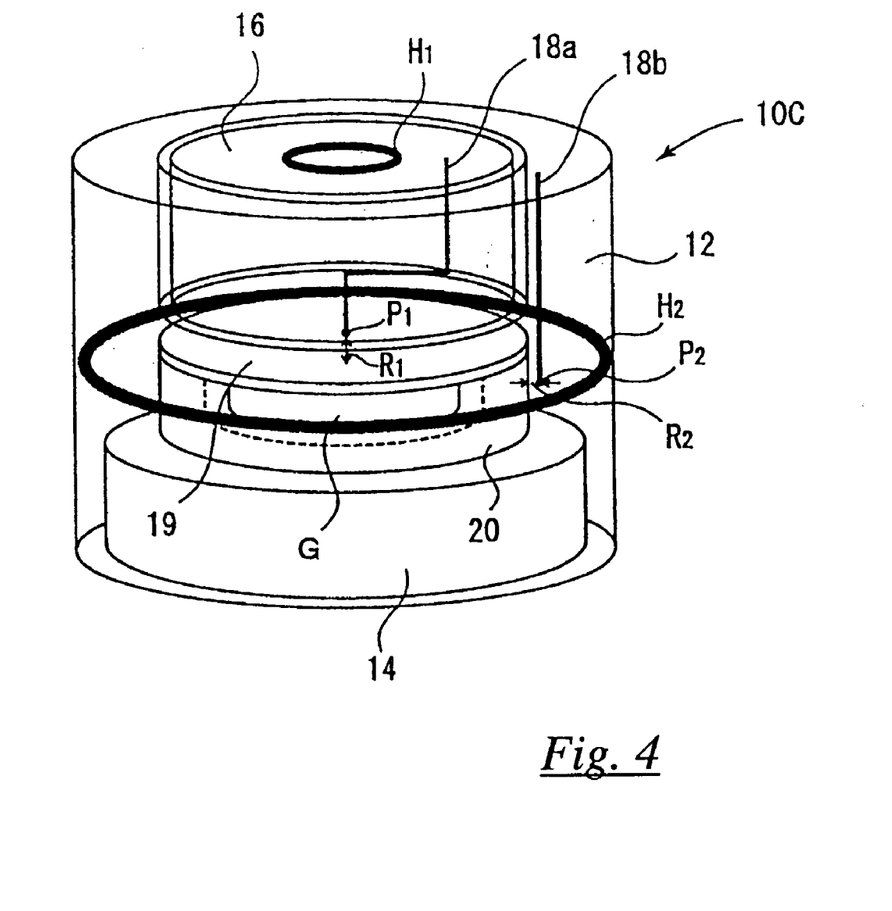
FIG. 4 is a schematic explanatory slant view showing still another embodiment of the annealing furnace used for the practice of the production method of an optical synthetic glass of the invention.

FIG. 4 shows an oblique explanatory view of another example of an annealing furnace according to the present invention. In FIG. 4, the same members or the members similar to those shown in FIG. 2 are indicated by using the same signs. Referring to the figure, the constitution is similar to that of the annealing furnace 10 shown in FIG. 2, except that the columnar synthetic quartz glass G to be heat treated is placed inside the annealing furnace 10C that is placed inside a covering body, which is a cylindrical container 20 provided with a quartz glass lid 19, and accordingly, thermocouples 18a and 18b are set outward from the center of the upper plane of said cylindrical container 20 by a first parted distance $R_1$, for instance, at a position $P_1$ parted at a distance of 10 mm, and outward from the outer peripheral side plane of said columnar synthetic quartz glass G by a second parted distance $R_2$, for instance, at a position $P_2$ parted at a distance of 10 mm, so that they may each measure temperatures at each of the positions $P_1$ and $P_2$, respectively. It is possible to separately control the temperatures of the upper and the lower surface and the outer peripheral side plane of the synthetic quartz glass G even in case the synthetic quartz glass is enclosed inside such a cylindrical container 20.

Figure 5:
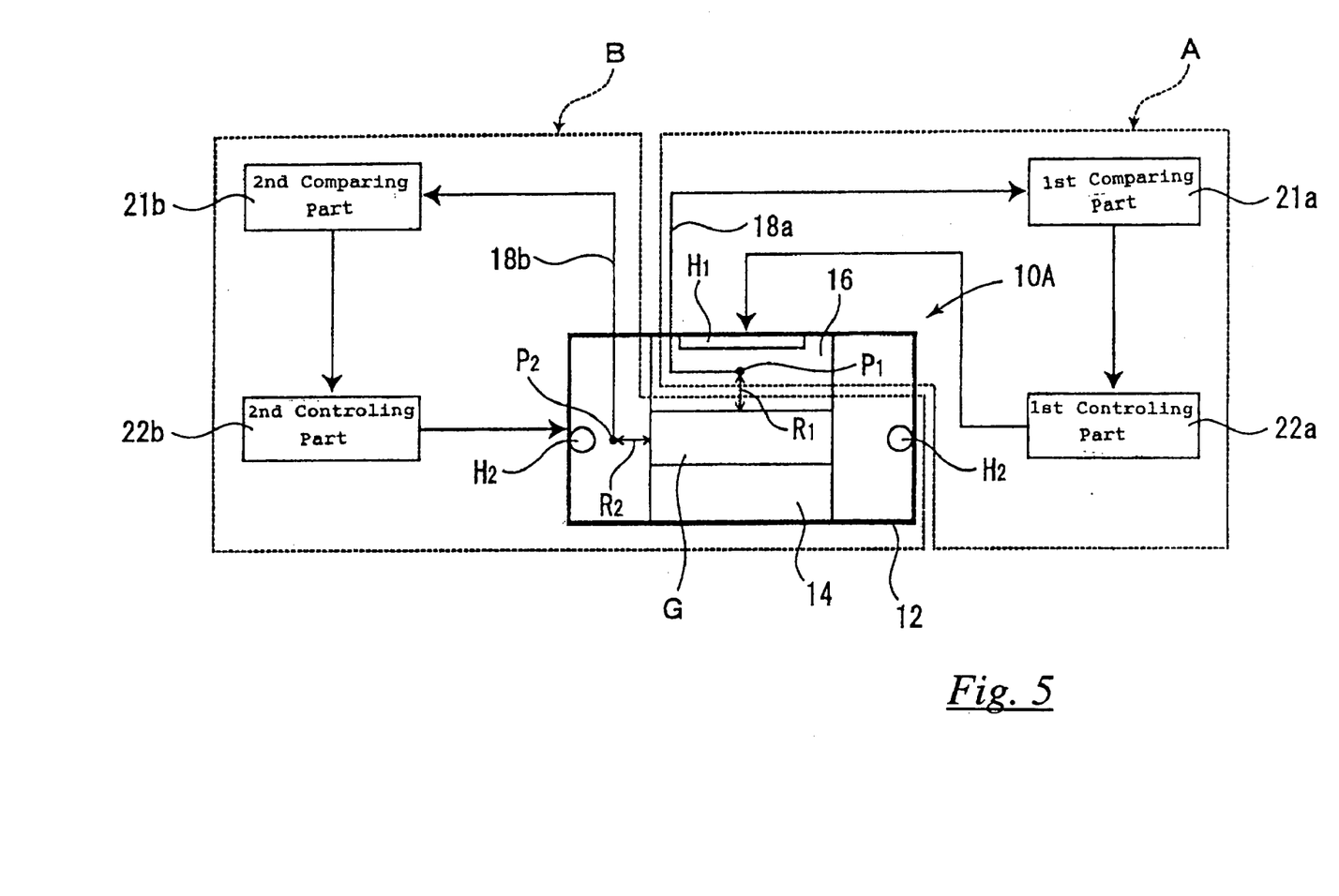
FIG. 5 is a schematic explanatory view showing an embodiment of the temperature-controlling mechanism in an annealing furnace.

Then, description on the mechanism for controlling the temperature of the annealing furnace is given below. FIG. 5 is a schematic explanatory diagram showing an example of a temperature-controlling mechanism. In the figure, the annealing furnace 10A as shown in FIG. 2 is taken as an example of the annealing furnace. Similar to the case as shown in FIG. 2, the annealing furnace 10A is equipped with a cylindrical chamber 12, a columnar base 14, a partition member 16, and thermocouples 18a and 18b, wherein a columnar synthetic quartz glass G to be heat-treated is mounted on the columnar base 14. The upper surface thermocouple 18a is provided at a position $P_1$ set outward from the center of the upper plane of the columnar synthetic quartz glass G by a first parted distance $R_1$, and the side plane side thermocouple 18b is mounted at a position $P_2$ set outward from the outer peripheral side plane of the columnar synthetic quartz glass G by a second parted distance $R_2$, to measure the temperatures at each of the positions $P_1$ and $P_2$, respectively.

A heater $H_1$ for heating the upper surface (the light-transmitting surface) is provided on the upper side of said partition member 16, and a ring-shaped heater $H_2$ for heating the side plane is provided on the inner peripheral side plane of the cylindrical chamber 12.

The temperature $T_1$ at the position $P_1$ measured by said upper surface side thermocouple 18a is sent to a first comparative portion 21a, and is compared with the temperature $T_3$ previously input to the program. The compared data obtained on the temperatures $T_1$ and $T_3$ at the first comparative portion 21a is then sent to the first controlling portion 22a. The control signal generated from said first controlling portion 22a based on the compared data controls the heater $H_1$ for heating the light transmitting surface (upper surface) to control the temperature of the upper surface side of the columnar synthetic quartz glass G. That is, the temperature-controlling mechanism A on the upper surface side is constructed by the upper surface side thermocouple 18a, the first comparative portion 21a, the first controlling portion 22a, and a heater $H_1$ for heating the light transmitting surface.

On the other hand, the temperature $T_2$ at the position $P_2$ measured by said side plane side thermocouple 18a is sent to a second comparative portion 21b, and is compared with the temperature $T_4$ previously input to the program. The compared data obtained on the temperatures $T_2$ and $T_4$ at the second comparative portion 21b is then sent to the first controlling portion 22b. The control signal generated from said second controlling portion 22b based on the compared data controls the heater $H_2$ for heating the side plane side to control the temperature of the side plane side of the columnar synthetic quartz glass G. That is, the temperature-controlling mechanism B on the side plane side is constructed by the upper surface side thermocouple 18b, the second comparative portion 21b, the second controlling portion 22b, and a heater $H_2$ for heating the side plane side.

The example shown in FIG. 5 specifically refers to a case in which the upper surface side thermocouple 18a alone is provided as the thermocouple of the light transmitting surface side; however, as shown in FIG. 3, the heater for heating the light transmitting surface and the heater for heating the side plane may be controlled separately by individual temperature mechanisms even in case a lower surface side thermocouple is also provided.

The present invention is explained in further detail by way of examples below, but it should be understood that these examples are not to be understood as limiting the present invention.

Each of the physical properties referred in the Examples and Comparative Examples were obtained by measuring methods as follows.

Birefringence: Measurements were made by using an automatic birefringence measurement system (EXICOR 350AT, manufactured by HINDS Instruments, Inc.) equipped with a He—Ne laser (632.8 nm) as the light source.

Refractive index distribution $\Delta n$: Measurements were made by using an interferometer (Mark GPIxp, manufactured by Zygo Corporation) equipped with a He—Ne laser (632.8 nm) as the light sourse.

EXAMPLE 1

A synthetic quartz glass ingot 120 mm in outer diameter and 630 mm in length was produced by means of direct flame hydrolysis method comprising introducing gasified high purity methyl trimethoxysilane into an oxyhydrogen flame to generate soot-like silica, and melt-depositing the resulting product on a rotating base body. The both ends of the ingot thus obtained were welded to the support rods held by chucks of a lathe for processing quartz glass to rotate the synthetic quartz glass ingot.

The rotating ingot was locally heated with a burner to form a molten band region, and stress was generated on the molten band region by independently changing the direction of rotation and the number of revolutions of the chuck. In this manner, striae removal and homogenization were performed on the ingot. Then, the distance between the chucks of the lathe for processing synthetic quartz glass quartz glass was narrowed to deform the synthetic quartz glass into a ball-like shape by applying pressure to the synthetic quartz glass, the ball-like synthetic quartz glass was cut off, and the synthetic quartz glass ingot was attached to the support rod of the support table in such a manner that the cut off planes were disposed to the upper and the lower planes. The synthetic quartz glass ingot was homogenized again by subjecting it to heating with a burner for softening. A rod-like synthetic quartz glass ingot was thus obtained.

No striae and layered structures in three directions were observed on the thus obtained ingot. In order to shape said synthetic quartz glass ingot, the ingot was placed inside a graphite crucible having a Na ash content of 20 ppm or lower, and after replacing the atmosphere inside the crucible with gaseous nitrogen and maintaining the temperature inside the crucible at 1900° C., the ingot was held therein for 10 minutes for shaping. The columnar quartz glass member 300 mm in outer diameter and 100 mm in thickness was held inside an annealing furnace made of a furnace material of 99% or higher alumina and having a structure similar to that shown in FIG. 2 in such a manner that the light transmitting direction may be set in the vertical direction. In the annealing furnace shown in FIG. 2, the first and the second parted distances were both set to 10 mm.

Figure 6:
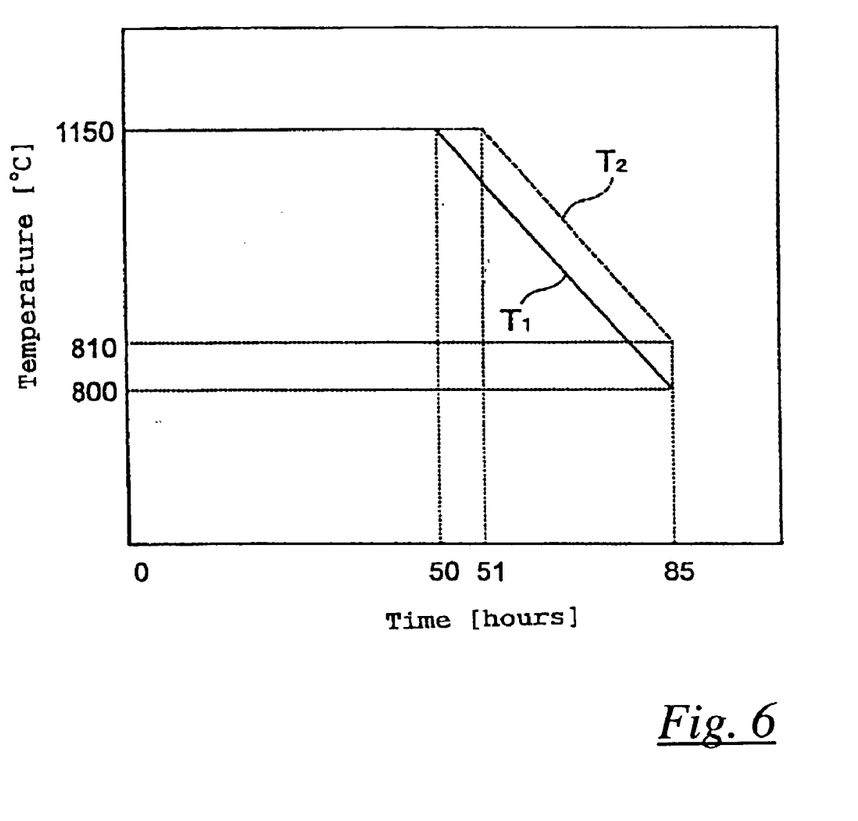
FIG. 6 is a graph showing the relation between the temperature and the time in the heat treatment in Example 1.
Figure 8:
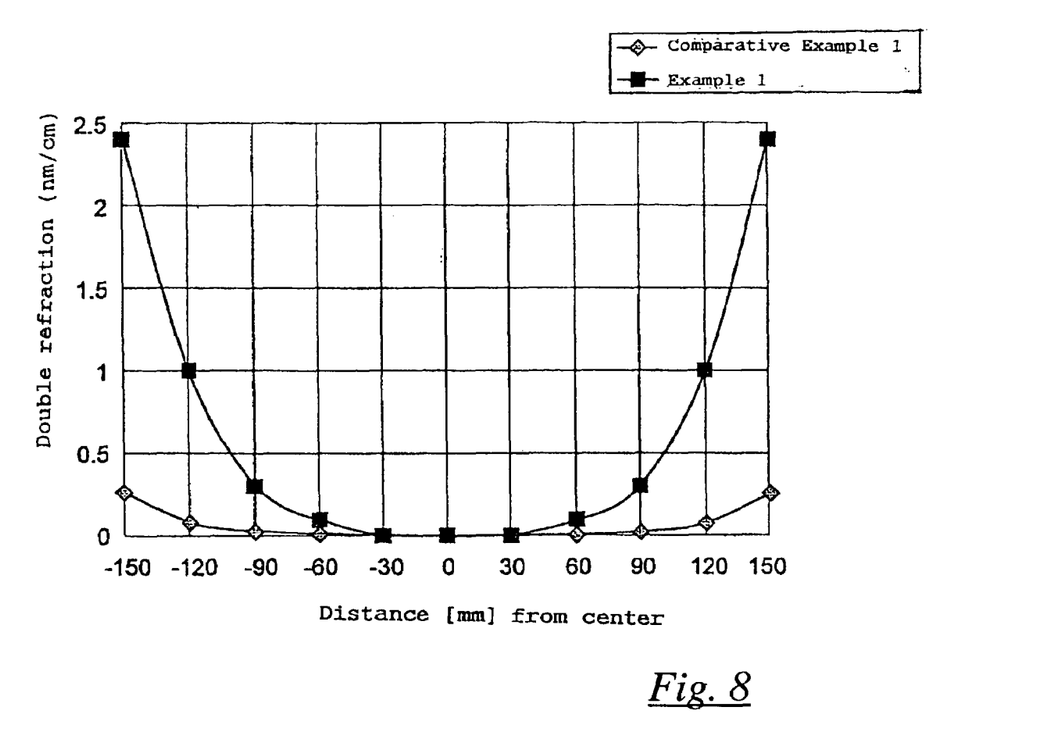
FIG. 8 is a graph showing the relation between the distance from the center of the light transmitting surface of the synthetic quartz glass member of the heat treatment line and the value of the double refraction of the light transmitting direction in Example 1.

While maintaining the state as described above, the quartz glass member was held at 1150° C. for 50 hours in accordance with the temperature program shown in FIG. 6. Then, the temperature of the upper surface side (at the first temperature $T_1$) was lowered at a rate of 10° C./h. After 1 hour from starting the lowering of temperature, the temperature of the outer peripheral side plane side (at a second temperature of $T_2$) was lowered at a rate of 10° C./h, and the quartz member was subjected to natural cooling from the point the temperature indicated by the thermocouple set on the upper surface side reached 800° C. The optical properties of the synthetic quartz glass member was investigated, and a graph showing the relation between the distance from the center of the light transmitting surface and the value of birefringence was obtained as shown in FIG. 8. Referring to FIG. 8, the maximum value of birefringence in the light transmitting direction was found to be 0.25 nm/cm. A refractive index distribution $\Delta n$ of $1.5 \times 10^{-6}$ was obtained.

EXAMPLE 2

A quartz glass member shaped in accordance with the procedure similar to that described in Example 1 was placed vertically inside an annealing furnace having the structure similar to that shown in FIG. 3. Heat treatment was applied to the quartz glass member in an operation similar to that described in Example 1 to obtain a synthetic quartz member. On examining the optical properties of the synthetic quartz glass member, a maximum birefringence value in the light transmitting direction of 0.24 nm/cm and a refractive index distribution $\Delta n$ of $1.2 \times 10^{-6}$ were obtained.

EXAMPLE 3

A quartz glass member shaped in accordance with the procedure similar to that described in Example 1 was placed inside a quartz glass cylindrical container, and was set vertically inside an annealing furnace having the structure similar to that shown in FIG. 3. In this case, the thermocouples for temperature control were set at a position parted outward from the center of the upper surface of the cylindrical container by 10 mm, and at a position parted outward from the outer peripheral surface of the container by 10 mm. The synthetic quartz member was produced in a manner similar to that described in Example 1, except that the temperature of the upper surface side of the container was lowered at a rate of 20° C./h after holding at a temperature of 1150° C. for 50 hours, that the temperature lowering of the outer peripheral surface side was started at a rate of 20° C./h 30 minutes thereafter, and that the container was left for natural cooling at the point the temperature reached 800° C. On examining the optical properties of the synthetic quartz glass member, a maximum birefringence value in the light transmitting direction of 0.22 nm/cm and a refractive index distribution $\Delta n$ of $1.0 \times 10^{-6}$ were obtained.

COMPARATIVE EXAMPLE 1

Figure 7:
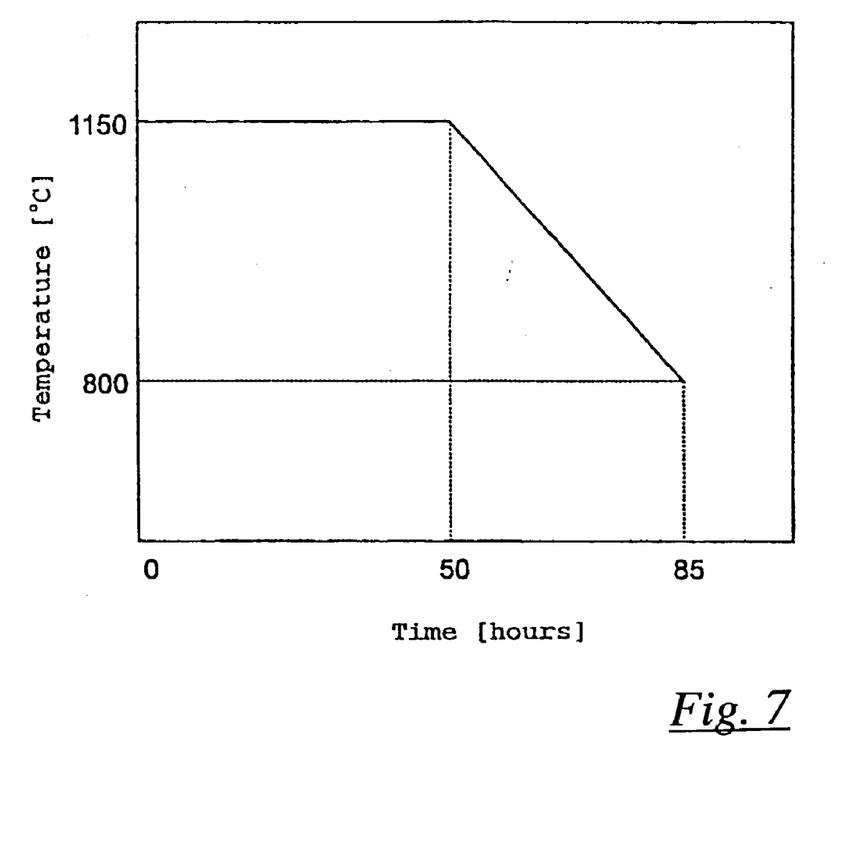
FIG. 7 is a graph showing the relation between the temperature and the time in the heat treatment in Comparative Example 1.

A synthetic quartz member was produced in a procedure similar to that described in Example 1, except that the temperature of the quartz glass member set inside the annealing furnace was lowered at a rate of 10° C./h in accordance with the temperature program shown in FIG. 7 after holding the member at 1150° C. for 50 hours without using separate temperature control mechanisms, and that the member was left for natural cooling at the point temperature reached 800° C. The optical properties of the synthetic quartz glass member was investigated, and a graph showing the relation between the distance from the center of the light transmitting surface and the value of birefringence was obtained as shown in FIG. 8. Referring to FIG. 8, the maximum value of birefringence in the light transmitting direction was found to be 2.4 nm/cm. A refractive index distribution $\Delta n$ of $2.3 \times 10^{-6}$ was obtained.

COMPARATIVE EXAMPLE 2

As in Example 1, after holding the quartz glass member set inside the annealing furnace at 1150° C. for 50 hours, the temperature of the upper surface side was lowered at a rate of 10° C./h. The same procedure as that described in Example 1 was followed, except that, after 3 hours since starting cooling of the upper surface side, the outer peripheral side was cooled at a rate of 10° C./h, and that the member was left for natural cooling from the point indicated temperature reached 800° C. On examining the optical properties of the synthetic quartz glass member, a maximum birefringence value in the light transmitting direction of 2.0 nm/cm and a refractive index distribution $\Delta n$ of $3.4 \times 10^{-6}$ were obtained.

COMPARATIVE EXAMPLE 3

As in Example 1, after holding the quartz glass member set inside the annealing furnace at 1150° C. for 50 hours, the temperature of the upper surface side was first lowered at a rate of 80° C./h. The same procedure as that described in Example 1 was followed, except that, after 3 minutes since starting cooling of the upper surface side, the outer peripheral side was left for natural cooling from the point indicated temperature reached 800° C. On examining the optical properties of the synthetic quartz glass member, a maximum birefringence value in the light transmitting direction of 1.8 nm/cm and a refractive index distribution Δn of $3.7 \times 10^{-6}$ were obtained.

ADVANTAGE OF THE INVENTION

As described above, the method according to the present invention enables achieving a great effect of producing an optical quartz glass having a birefringence in the light transmitting direction of lower than 0.5 nm/cm and having favorable refractive index distribution.

DESCRIPTION OF THE REFERENCE NUMERALS AND SIGNS 10A, 10B, and 10C: Annealing furnaces, 12: Cylindrical chamber, 14: Columnar base, 14: Base plate, 16: Partition member, 16a: first partition member, 16b: second partition member, 17: Disposing space, 18a and 18b: Thermocouples, 19: Lid, 20: Cylindrical container, 21a: first comparative portion, 21b: second comparative portion, 22a: first controlling portion, 22b: second controlling portion, A: Temperature-controlling mechanism for the upper surface side, B: Temperature-controlling mechanism for side surface side, E: Light transmitting surface, F: Isothermal surface, G: Columnar synthetic quartz glass, $H_1$ and $H_2$: Heaters, L: Light transmitting direction, $P_1$ and $P_2$: Temperature measuring positions, $R_1$: first parted distance, and $R_2$: second parted distance.

The invention claimed is:

1. A method of producing an optical synthetic quartz glass, said method comprising a step of raising the temperature of a columnar optical synthetic quartz glass preform to a temperature in a range of from 800° C. to 1200° C., and after preserving the temperature of preform in said range for a definite time, lowering the temperature, wherein the temperature is lowered with a temperature difference of from 1 to 20° C. between a first temperature $T_1$ of a light transmitting surface of the optical synthetic quartz glass preform and a second temperature $T_2$ of an outer peripheral side surface of the optical synthetic quartz glass preform with said temperatures lowering at rates of from 2 to 50° C./hour, wherein, in the temperature-lowering step, the first temperature $T_1$ is lower than the second temperature $T_2$, the light transmitting surface being substantially entirely at the first temperature $T_1$ and the outer peripheral side surface being substantially entirely at the second temperature $T_2$.

2. The method of producing an optical synthetic quartz glass described in claim 1, wherein the above-described optical synthetic quartz glass preform is a columnar form having a diameter of from 150 to 350 mm and a thickness of from 40 to 120 mm.

3. A method of producing an optical synthetic quartz glass, said method comprising a step of raising the temperature of a colunmar optical synthetic quartz glass preform in a furnace to a temperature in a range of from 800° C. to 1200° C., and after preserving the temperature of the preform in said range for a definite time, lowering the temperature, the temperature being lowered with a temperature difference of from 1 to 20° C. between a first temperature $T_1$ at an internal furnace position located outward from a center of at least one of an upper and a lower surface, said surfaces being light transmitting surfaces of the optical synthetic quartz glass preform, by a first distance and a second temperature $T_2$ at an internal furnace position located outward from an outer peripheral side surface of the optical synthetic quartz glass preform by a second distance, at temperature-lowering rates of from 2 to 50° C./hour; wherein in the temperature-lowering step, the first temperature $T_1$ is lower than the second temperature $T_2$, and wherein the temperatures $T_1$ and $T_2$ are measured and controlled so as to maintain said temperature difference.

4. The method of producing an optical synthetic quartz glass described in claim 3, wherein both the first and the second distance are from 5 mm to 100 mm.

5. The method of producing an optical synthetic quartz glass described in claim 4, wherein the above-described optical synthetic quartz glass preform is a columnar form having a diameter of from 150 to 350 mm and a thickness of from 40 to 120 mm.

6. The method of producing an optical synthetic quartz glass described in claim 3, wherein the above-described optical synthetic quartz glass preform is a columnar form having a diameter of from 150 to 350 mm and a thickness of from 40 to 120 mm.

7. A method of producing an optical synthetic quartz glass, said method comprising a step of raising the temperature of a columnar optical synthetic quartz glass preform to a temperature in a range of from 800° C. to 1200° C., and after preserving the temperature of the preform in said range for a definite time, lowering the temperature, the temperature being lowered with a temperature difference of from 1 to 20° C. between a first temperature $T_1$ at an internal furnace position located outward from a center of at least one of an upper and a lower surface, said surfaces being light transmitting surfaces of the optical synthetic quartz glass preform, by a first distance and a second temperature $T_2$ at an internal furnace position located outward from an outer peripheral side surface of the optical synthetic quartz glass preform by a second distance, at temperature-lowering rates of from 2 to 50° C./hour; wherein in the temperature-lowering step, the first temperature $T_1$ is higher than the second temperature $T_2$ and wherein the temperatures $T_1$ and $T_2$, are measured and controlled so as to maintain said temperature difference.

8. The method of producing an optical synthetic quartz glass described in claim 7, wherein both the first and the second distance are from 5 mm to 100 mm.

9. The method of producing an optical synthetic quartz glass described in claim 7, wherein the above-described optical synthetic quartz glass preform is a columnar form having a diameter of from 150 to 350 mm and a thickness of from 40 to 120 mm.

10. A method of producing an optical synthetic quartz glass, said method comprising a step of raising the temperature of a columnar optical synthetic quartz glass preform to a temperature in a range of from 800° C. to 1200° C., and after preserving the temperature of the preform in said range for a definite time, lowering the temperature, the temperature being lowered with a temperature difference of from 1 to 20° C. between a first temperature $T_1$ at a position located outward from a center of at least one of an upper and a lower surface, said surfaces being light transmitting surfaces of the optical synthetic quartz glass preform, by a first distance and a second temperature $T_2$ at a position located outward from an outer peripheral side surface of the optical synthetic quartz glass preform by a second distance, at temperature-lowering rates of from 2 to 50° C./hour; wherein in the step of temperature lowering, separate temperature-controlling mechanisms are used for a surface parallel to the light transmitting surface and a surface perpendicular to the light-transmitting surface.

11. The method of producing an optical synthetic quartz glass described in claim 10, wherein in the temperature-lowering step, the first temperature $T_1$ is lower than the second temperature $T_2$.

12. The method of producing an optical synthetic quartz glass described in claim 10, wherein in the temperature-lowering step, the first temperature $T_1$ is higher than the second temperature $T_2$.

13. The method of producing an optical synthetic quartz glass described in claim 10, wherein both the first and the second distance are from 5 mm to 100 mm.

14. The method of producing an optical synthetic quartz glass described in claim 10, wherein the above-described optical synthetic quartz glass preform is a columnar form having a diameter of from 150 to 350 mm and a thickness of from 40 to 120 mm.

15. A method of producing an optical synthetic quartz glass, said method comprising a step of raising the temperature of a columnar optical synthetic quartz glass preform to a temperature in a range of from 800° C. to 1200° C., and after preserving the temperature of preform in said range for a definite time, lowering the temperature, wherein the temperature is lowered with a temperature difference of from 1 to 20° C. between a first temperature $T_1$ of a light transmitting surface of the optical synthetic quartz glass preform and a second temperature $T_2$ of an outer peripheral side surface of the optical synthetic quartz glass preform with said temperatures lowering at rates of from 2 to 50° C./hour, wherein, in the temperature-lowering step, the first temperature $T_1$ is lower than the second temperature $T_2$;
  wherein in the step of temperature lowering, separate temperature-controlling mechanisms are used for a surface parallel to the light transmitting surface and a surface perpendicular to the light-transmitting surface.

16. A method of producing an optical synthetic quartz glass, said method comprising a step of raising the temperature of a columnar optical synthetic quartz glass preform to a temperature in a range of from 800° C. to 1200° C., and after preserving the temperature of preform in said range for a definite time, lowering the temperature, wherein the temperature is lowered with a temperature difference of from 1 to 20° C. between a first temperature $T_1$ of a light transmitting surface of the optical synthetic quartz glass preform and a second temperature $T_2$ of an outer peripheral side surface of the optical synthetic quartz glass preform with said temperatures lowering at rates of from 2 to 50° C./hour, wherein, in the temperature-lowering step, the first temperature $T_1$ is higher than the second temperature $T_2$, the light transmitting surface being substantially entirely at the first temperature $T_1$ and the outer peripheral side surface being substantially entirely at the second temperature $T_2$.

17. The method of producing an optical synthetic quartz glass described in claim 16, wherein the above-described optical synthetic quartz glass preform is a columnar form having a diameter of from 150 to 350 mm and a thickness of from 40 to 120 mm.

18. A method of producing an optical synthetic quartz glass, said method comprising a step of raising the temperature of a columnar optical synthetic quartz glass preform to a temperature in a range of from 800° C. to 1200° C., and after preserving the temperature of preform in said range for a definite time, lowering the temperature, wherein the temperature is lowered with a temperature difference of from 1 to 20° C. between a first temperature $T_1$ of a light transmitting surface of the optical synthetic quartz glass preform and a second temperature $T_2$ of an outer peripheral side surface of the optical synthetic quartz glass preform with said temperatures lowering at rates of from 2 to 50° C./hour, wherein, in the temperature-lowerinig step, the first temperature $T_1$ is higher than the second temperature $T_2$,
  wherein in the step of temperature lowering, separate temperature-controlling mechanisms are used for a surface parallel to the light transmitting surface and a surface perpendicular to the light-transmitting surface.

* * * * *